(12) United States Patent
Christian et al.

(10) Patent No.: US 9,054,361 B2
(45) Date of Patent: Jun. 9, 2015

(54) UTILIZING VACUUM TO PRE-COMPRESS FOAM TO ENABLE CELL INSERTION DURING HV BATTERY MODULE ASSEMBLY

(71) Applicant: GM GLOBAL TECHNOLOGY OPERATIONS LLC, Detroit, MI (US)

(72) Inventors: Benjamin R. Christian, Novi, MI (US); Sami A. Syed, Windsor (CA); Herman K. Phlegm, Oak Park, MI (US); John G. Dorrough, Oak Park, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 73 days.

(21) Appl. No.: 13/681,941

(22) Filed: Nov. 20, 2012

(65) Prior Publication Data

US 2014/0141307 A1    May 22, 2014

(51) Int. Cl.
   *H01M 2/10*   (2006.01)
(52) U.S. Cl.
   CPC ........ *H01M 2/1083* (2013.01); *Y10T 29/49108* (2015.01); *Y02E 60/122* (2013.01)

(58) Field of Classification Search
   CPC ....... H01M 2/10; H01M 2/1083; Y02E 60/12
   USPC ........................ 429/99, 120; 29/623.1–623.5; 165/104.23, 104.33, 80.2; 428/71, 69; 264/45.2, 45.4, 51; 206/497; 220/231, 220/592.27, 720, 234
   See application file for complete search history.

(56) References Cited

U.S. PATENT DOCUMENTS

| 4,620,633 | A  | * | 11/1986 | Lookholder | 206/523 |
|---|---|---|---|---|---|
| 6,988,535 | B2 | * | 1/2006 | Upadhya et al. | 165/80.4 |
| 2009/0255109 | A1 | * | 10/2009 | Weber et al. | 29/623.2 |

* cited by examiner

*Primary Examiner* — Patrick Ryan
*Assistant Examiner* — Kiran Quraishi
(74) *Attorney, Agent, or Firm* — Brooks Kushman P.C.

(57) ABSTRACT

A method of assembling a battery module assembly includes a step of preparing a plurality of battery cell stacks. Each battery cell stack is constructed by positioning a pre-compressed foam unit interposed between a first battery cell and a second battery cell. Each battery cell stack is positioned in a receiving frame. After such positioning, the pre-compressed foam unit of each battery cell stack is expanded.

10 Claims, 2 Drawing Sheets

UTILIZING VACUUM TO PRE-COMPRESS FOAM TO ENABLE CELL INSERTION DURING HV BATTERY MODULE ASSEMBLY

STATEMENT REGARDING FEDERALLY SPONSORED RESEARCH OR DEVELOPMENT

The invention was made with Government support under Contract No. DE-FC26-08NT04386. The Government has certain rights to the invention.

FIELD OF THE INVENTION

In at least one aspect, the present invention relates to systems and to methods of assembling battery module assemblies.

BACKGROUND

Large capacity rechargeable batteries are currently being investigated for use in electric vehicles. The ultimate feasibility of electric vehicles depends on significantly reducing the associated costs. Reduction in the costs of battery assemblies is particularly important.

Lithium ion batteries are an important type of battery technology. Most battery assemblies, including lithium ion battery assemblies, include a plurality of individual electrochemical cells. A cell consists of an anode, cathode, porous separator film, and an ionically conductive but electrically isolative electrolyte. The voltage of the cell is dependent on the electrochemical potential of the cell chemistry, the current is dependent on the rate at which the ions shuttle between the anode and cathode, and the capacity depends on the total surface area of the cell. To maintain capacity over the life of the cell, it is important to apply pressure equally across the cell surface area. There are two primary designs for large amp hour capacity cells typically used in automotive application; cylindrical and prismatic. For cylindrical cells, pressure is maintained by the spiral nature of the cell design. For prismatic cells, uniform pressure is maintained by means of foam or spring loaded plate.

For high power application, a plurality of battery cells are utilized and assembled into a battery module. Moreover, such battery modules are assembled into battery packs which include a cooling system and related electronics for operating the batteries. The cooling systems typically include a plurality of air or liquid cooled metallic (e.g., copper and/or aluminum) fins interspersed between the battery cells, which must also maintain intimate contact with the cell for optimal heat transfer. Prior state of the art for the assembly of a battery module includes either stacking, or the mechanical pre-compression of the assembly prior to insertion into a module frame.

Accordingly, there is a need for improved battery module assembly designs and for methods of constructing such battery module assemblies.

SUMMARY OF THE INVENTION

The present invention solves one or more problems of the prior art by providing a method of assembling a battery module assembly that includes a plurality of battery cell elements. The method includes a step of preparing a plurality of battery cell stacks. Each battery cell stack is constructed by positioning a pre-compressed foam unit interposed between a first battery cell and a second battery cell. Each battery cell stack is positioned in a receiving frame. After such positioning, the pre-compressed foam unit of each battery cell stack is expanded.

In another embodiment, a method of assembling a battery module assembly that includes a plurality of battery cell elements is provided. The method includes a step of preparing a plurality of battery cell stacks. Each battery cell stack is constructed by positioning a pre-compressed foam unit interposed between a first battery cell and a second battery cell. The pre-compressed foam unit includes a vacuum sealed package having a spout and a polyurethane foam pad positioned within the vacuum sealed package. Each battery cell stack is positioned in a receiving frame. The spout is severed to expand the polyurethane foam pad of each battery cell stack.

In yet another embodiment, a battery module assembly formed by the methods set forth above is provided. The battery module includes a plurality of battery cell stacks each of which includes a first battery cell, a second battery cell and an expanded foam unit interposed between the first battery cell and the second battery cell. The expanded foam unit has a package and a foam pad positioned within the package. Characteristically, the package is severed. The battery module also includes a receiving frame in which the battery cell stacks are positioned.

BRIEF DESCRIPTION OF THE DRAWINGS

Exemplary embodiments of the present invention will become more fully understood from the detailed description and the accompanying drawings, wherein.

DESCRIPTION OF THE INVENTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Figure 1A:
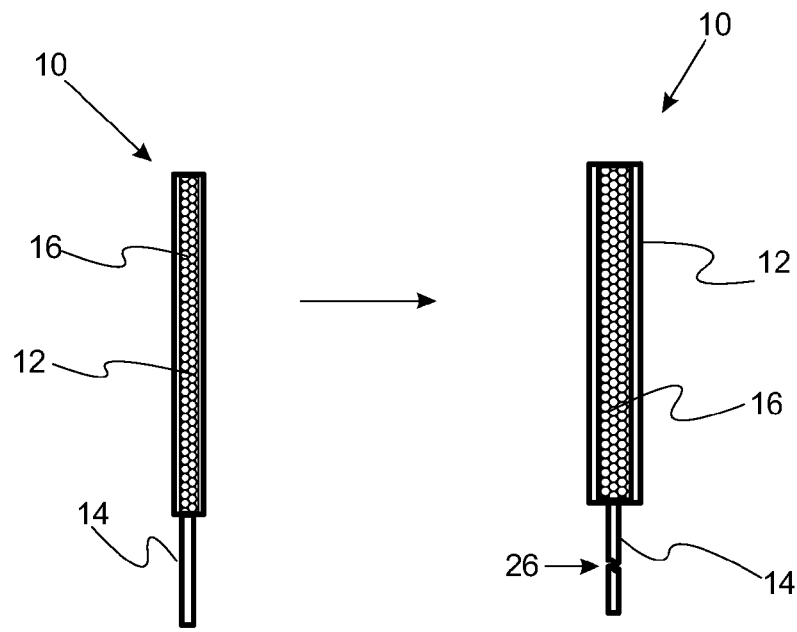
FIG. 1A is a schematic flowchart showing the expansion of a pre-compressed foam unit after severing a vacuum packed foam pad.
Figure 1B:
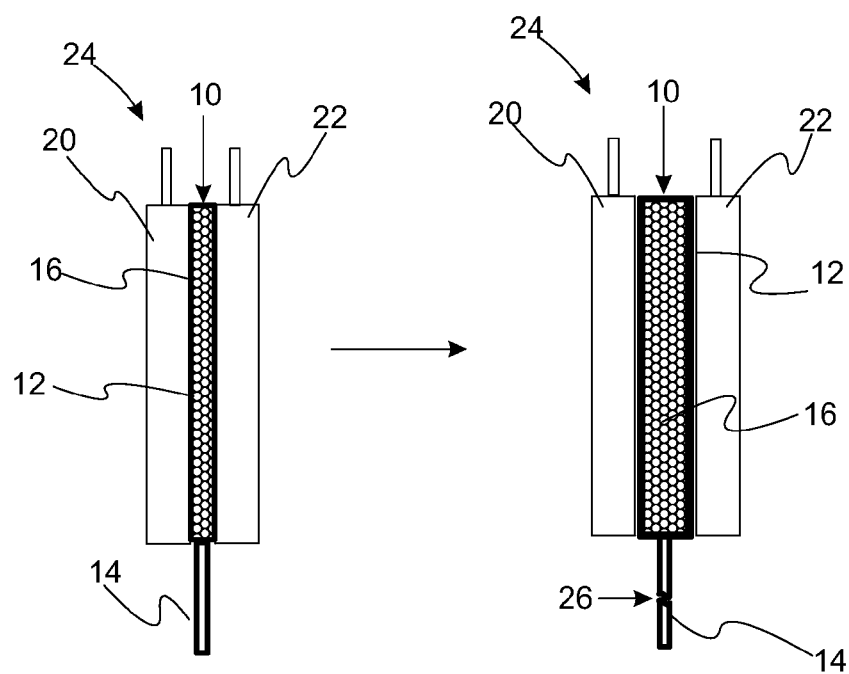
FIG. 1B is a schematic flowchart showing the expansion of a pre-compressed foam unit after severing a vacuum packed foam pad.
Figure 2:
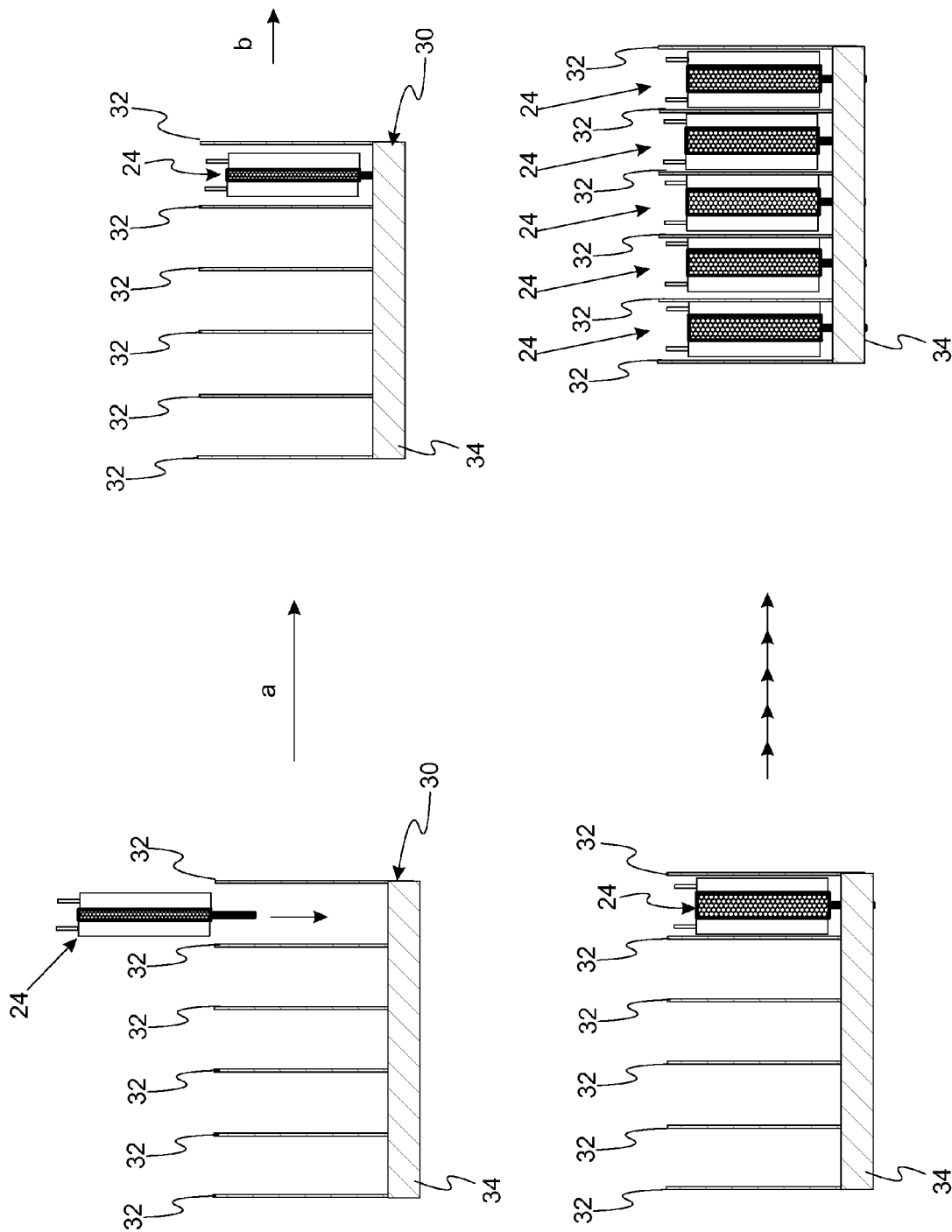
FIG. 2 is a schematic flowchart showing the assembly of a battery module assembly using pre-compressed foam units.

With reference to FIGS. 1A, 1B, and 2, a method of constructing a battery module assembly is provided. FIG. 1A is a schematic flowchart showing the expansion of a pre-compressed foam unit after severing a vacuum packed foam pad. FIG. 1B is a schematic flowchart showing the expansion of a pre-compressed foam unit after severing a vacuum packed foam pad. FIG. 2 is a schematic flowchart illustrating the inclusion of a vacuum packed foam layer in a battery assembly. Pre-compressed foam unit 10 includes vacuum sealed package 12 (e.g., a bag) having spout 14 and foam pad 16 positioned within the vacuum sealed package. In a refinement, pre-compressed foam pad 16 is compressed with pressure from about 8 to 20 psi, with a value of about 14 psi being typical. In a refinement, vacuum package 12 is formed from a polyester such as poly(ethylene terephthalate). In another refinement, foam pad 16 is formed from a foamed polymer. Examples of such compressible polymers include polyurethane, polyester, polyether, and the like, and combinations thereof. A polyurethane foam pad is found to be particularly useful for the present embodiment. Polyurethane foam pads are formed from isocyantes, polyols, chain extenders such as ethanolamine, diethanolamine ethylene glycol, diethylene glycol, catalysts and surfactants. Examples of isocyantes include, but are not limited to, toluene diisocyante, diphenylmethane diisocyante, and combinations thereof. Examples of polyols include, but are not limited to, polyether polyols. Examples of chain extenders include, but are not limited to, ethanolamine, diethanolamine ethylene glycol, diethylene glycol, and combinations thereof. Examples of catalysts include, but are not limited to, triethlyene diamine, dimethylcyclohexamine, and combinations thereof. Examples of surfactants include, but are not limited to, polydimethysiloxane, nonylphenyl ethoxylates, silicone oils, and polyoxylene block copolymers and combinations thereof.

In a refinement, foam pad 16 is compressed to a thickness that is from about 50 to 80 percent of the thickness of the uncompressed foam pad when vacuum packed. Typically, the uncompressed foam pad has a thickness from about 4 mm to about 12 mm. Pre-compressed foam unit 10 is positioned between battery cell 20 and battery cell 22 to form battery cell stack 24. Vacuum package 12 is severed thereby releasing the vacuum and expanding foam pad 16. In a refinement, vacuum package 12 is severed at spout 14 at position 26.

With reference to FIGS. 1A, 1B, and 2, battery cell stack 24 is positioned in receiving frame 30 as shown in step a). After such positioning, the pre-compressed foam unit 10 is expanded in step b) by severing vacuum package 12 as set forth above. In a refinement, receiving frame 30 includes a plurality of cooling fins 32 which are typically interposed between battery cell stacks 24. In a further refinement, receiving frame 30 further includes heat sink 34 contacting cooling fins 32. Typically, heat sink 34 is formed from a metal such as copper and/or aluminum. Cooling fins 32 are typically bonded to heat sink 34 in order to include thermal transfer and improve cooling of the battery cells during operation of the battery module. In a refinement, cooling fins 32 are fusion bonded to the heat sink. In another refinement, cooling fins 32 are soldered or brazed to heat sink 34. In still another refinement, cooling fins 32 are bonded to the heat sink by conductive adhesion. The fabrication method of the present embodiment allows for various designs for receiving frame 30 to be used. For example, split-fin cooling systems that include cooling fins 32 are readily adaptable to the present embodiment. Typically, when vacuum package 12 is severed and the foam pad expanded, the foam will still be slightly compressed between adjacent cooling fins 32.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of assembling a battery module assembly, the battery module assembly including a plurality of battery cell elements, the method comprising:
   preparing a plurality of battery cell stacks, each battery cell stack constructed by positioning a pre-compressed foam unit interposed between a first battery cell and a second battery cell, each pre-compressed foam unit including a vacuum sealed package having a spout and a foam pad positioned within the vacuum sealed package;
   positioning each battery cell stack in a receiving frame; and
   expanding the pre-compressed foam unit of each battery cell stack.

2. The method of claim 1 wherein the vacuum sealed package comprises a polyester.

3. The method of claim 1 wherein the foam pad is expanded by severing the spout.

4. The method of claim 1 wherein the foam pad comprises a component selected from the group consisting of polyurethane, polyester, polyether, and combinations thereof.

5. The method of claim 1 wherein the receiving frame includes a plurality of cooling fins.

6. The method of claim 5 wherein the receiving frame further includes a heat sink contacting the cooling fins.

7. The method of claim 6 wherein the cooling fins are interposed between battery cell stacks.

8. The method of claim 6 wherein the cooling fins are fusion bonded to the heat sink.

9. The method of claim 5 comprising split-fin cooling systems that include the cooling fins.

10. The method of claim 1 wherein the receiving frame receives the plurality of battery cell stacks.

* * * * *